United States Patent [19]

Stern et al.

[11] 3,929,598
[45] Dec. 30, 1975

[54] RECOVERY OF COPPER AND ZINC FROM LOW-GRADE NON-FERROUS MATERIALS

[75] Inventors: William R. Stern; Malcolm L. Jansen; Bess L. Vance, all of Tucson, Ariz.

[73] Assignee: The Anaconda Company, New York, N.Y.

[22] Filed: Aug. 8, 1974

[21] Appl. No.: 495,784

Related U.S. Application Data

[63] Continuation-in-part of Ser. No. 280,718, Aug. 14, 1972, abandoned.

[52] U.S. Cl. .................... 204/108; 204/119; 75/65; 75/101 R; 75/101 BE; 75/109; 75/117; 75/120; 423/42; 423/105
[51] Int. Cl.² .................... C25C 1/12; C25C 1/16
[58] Field of Search ............ 75/101 BE, 101 R, 109, 75/65, 103, 117, 120; 204/106, 108, 114, 119; 423/105, 42

[56] References Cited
UNITED STATES PATENTS

| | | | |
|---|---|---|---|
| 1,608,844 | 11/1926 | Edwards et al. | 123/33 |
| 1,785,247 | 12/1930 | Burkey et al. | 75/63 |
| 3,573,182 | 3/1971 | Churchward et al. | 204/119 |
| 3,832,162 | 8/1974 | Smith | 75/63 |

*Primary Examiner*—R. L. Andrews
*Attorney, Agent, or Firm*—Pennie & Edmonds

[57] ABSTRACT

Copper and zinc are separately recovered in the form of substantially pure marketable products from low grade materials, such as metallic copper and brass scrap (e.g., junked automobile radiators) and oxidized residues (e.g., smelter flue dusts) which contain relatively large proportions of copper and zinc and relatively small proportions of other non-ferrous elements, by an improved ammoniacal leaching procedure. The low grade material is leached with an aqueous ammoniacal solution (ammonium sulfate or ammonium carbonate solution), dissolving the copper and zinc and leaving an insoluble residue. The copper-zinc solution is treated with a liquid ion exchanger to produce a raffinate containing a zinc ammonium complex in solution which is substantially completely free of copper. The liquid ion exchanger then is treated with an aqueous acid solution to form an eluant solution containing copper and substantially completely free of zinc and other metals. Substantially pure copper is recovered from the eluant solution; and the raffinate solution is treated to form a substantially pure zinc product. The copper and zinc depleted residual ammoniacal solution is recycled for re-use in the leaching operation.

16 Claims, 2 Drawing Figures

RECOVERY OF COPPER AND ZINC FROM LOW-GRADE NON-FERROUS MATERIALS

CROSS REFERENCE TO RELATED APPLICATION

This is a continuation in part of copending U.S. application Ser. No. 280,718, filed Aug. 14, 1972 and now abandoned.

BACKGROUND OF THE INVENTION

Ammoniacal leaching of non-ferrous copper-bearing scrap, smelter flue dust, and other low grade materials has been proposed many times, but has not become a significant commercial procedure for recovering copper or zinc from such materials. Both copper and zinc dissolve quite readily in aqueous ammoniacal solutions, but the difficulty encountered in producing separate substantially pure copper and zinc products from the leach solution has not heretofore been satisfactorily solved.

The Wagner U.S. Pat. No. 2,912,305, for example, describes leaching of copper alloy scrap with an ammonium carbonate solution, and seeks to separate the dissolved copper and zinc by heating the solution to drive off ammonia and carbon dioxide and leave behind a residue of mixed copper and zinc oxides. This mixture is treated with caustic alkali to form a soluble sodium zincate which can be leached from the residual copper oxide.

The Van Hare et al. U.S. Pat. No. 2,805,918 likewise proposes leaching copper-zinc scrap with ammonium carbonate solution, and then by controlled heating of the leach solution selectively precipitating a complex zinc ammonium oxide-carbonate while leaving the copper ammonium carbonate in solution.

The Montgomery U.S. Pat. No. 2,961,295 like Van Hare et al., proposes to selectively precipitate a zinc carbonate complex from an ammonium carbonate solution of copper and zinc by controlled heating under sub-atmospheric pressure.

Separation of copper and zinc by these procedures is both difficult to control and incomplete. To secure more effective separation, Allen et al. in U.S. Pat. Nos. 2,647,830 and 2,647,832 have proposed treating an ammoniacal carbonate solution of copper and zinc in an autoclave at high pressure with a reducing gas such as carbon monoxide to precipitate metallic copper in substantially pure form, leaving the zinc in solution. The obvious disadvantages of this procedure are the high capital cost and operational difficulties involved in conducting the separation procedure in high pressure autoclaves. While the procedure has had limited use, it has not been found to have significant economic advantages over conventional pyrometallurgical scrap treatment processes.

In addition to treatment of scrap, the leaching of copper and zinc ores and concentrates with an ammoniacal solution has also been proposed. The Nitchie U.S. Pat. No. 1,258,934 describes heating oxidized materials such as flue dusts and fumes containing copper and zinc, along with other metals, with an ammonium salt, such as ammonium sulfate, and then leaching the resulting product with water to recover copper, zinc, and other metal values in the aqueous solution. The zinc is precipitated from the solution as a carbonate, but no effective procedure for separating the copper is described and Nitchie states that if the solution is not first purified the zinc carbonate precipitate will contain copper and also iron.

Edwards et al. in U.S. Pat. No. 1,608,844, describe leaching oxidized ores with ammonium carbonate, and then precipitating a copper oxide product from the solution by careful control of temperature and alkalinity of the leach solution.

Forward and Mackiw (British Pat. No. 746,633) describe leaching of zinciferous sulfide ores and concentrates containing very small amounts of copper with ammonium sulfate solution in an autoclave at high pressure, and then boiling to drive off ammonia until the copper precipitates from solution as a copper sulfide. Zinc carbonate is then precipitated from the residual sulfate solution by treatment with carbon dioxide.

Except for limited use of the high pressure autoclave process as described by Allen et al., there appears to have been no commercial use of ammoniacal leaching for recovery of copper and zinc from low-grade copperzinc scrap, flue dusts, etc., evidently for lack of an efficient and economical means for separating and separately recovering in high purity form both the copper and the zinc dissolved in the leach solution.

STATEMENT OF THE INVENTION

The present invention provides a new and economical procedure for separating and separately recovering copper and zinc from low grade metallic and oxidized materials containing relatively large proportions of copper and zinc in association with relatively small proportions of other elements, such as scrap automobile radiators and flue dusts, by leaching such materials with an aqueous ammoniacal solution e.g., ammonium sulfate solution or ammonium carbonate solution (in the presence of air or other source of oxygen if necessary) to form a leach solution containing copper ammonium complex and zinc ammonium complex, and separating the resulting leach solution from the undissolved residue. In accordance with the invention, the copper is selectively removed from the leach solution by treatment with a liquid ion exchanger, thereby producing as a raffinate an aqueous ammoniacal solution containing zinc in solution as a zinc ammonium complex and substantially free of copper. The liquid ion exchanger is subsequently treated with an aqueous acid solution to form an aqueous acid eluant solution containing copper and substantially completely free of zinc. The eluant solution is treated to recover substantially pure copper therefrom, and the eluted liquid ion exchanger recycles to treatment of additional leach solution. The raffinate solution is treated to produce and recover the zinc in the form of a substantially pure zinc product, and the residual ammoniacal solution is recycled for re-use in leaching a further quantity of the low-grade material.

One advantageous procedure for recovering the zinc is by electrowinning. The zinc may be electrowon directly from the copper-free ammoniacal raffinate; or such raffinate may be subjected to treatment with a further ion exchanger to extract the zinc, after which such further ion exchanger may be treated with an acid solution to form an eluant solution containing zinc, and the zinc may be electrowon from such eluant solution.

In another procedure for recovering zinc which is particularly suited for use in treating ammoniacal carbonate solutions, carbon dioxide is introduced into the raffinate solution from the copper extraction operation, while maintaining such solution under substantial superatmospheric pressure, to precipitate a substantially pure zinc carbonate product; and zinc is recovered from such precipitate in the form of a substantially pure product such as zinc oxide or zinc metal. Treatment of the raffinate with carbon dioxide does not appear to precipitate simple zinc carbonate, $ZnCO_3$. Rather the precipitate appears to be a mixture or complex comprising zinc carbonate, zinc ammoniacal carbonate, and perhaps a zinc bicarbonate. For convenience, however, the precipitate is referred to herein as zinc carbonate, or as a zinc carbonate product; and it decomposes with heating to zinc oxide, $ZnO$.

Undissolved residue of the material being leached may contain a substantial proportion of lead and tin such as solder from radiators, and in such case this residue may be heated to a temperature above the melting temperature of the solder (say 250° to 400°C.) to liquate a lead-tin solder which is separated from the remainder of the residue. If the latter contains any significant values it may be treated in any conventional manner to recover them.

If the material leached contains nickel or cobalt in addition to copper and zinc, these additional metals will dissolve in the leach solution. Silver, if present, may also dissolve to some extent. Preferably scrap or other material which is low in nickel and cobalt is used, but the process is designed to accept materials containing these metals in modest amounts. These additional heavy metals can all be rejected from the liquid ion exchanger by conducting the ion exchange operation in several stages and by proper control of conditions prevailing during such operation (see, for example, Ritcey and Lucas, Canadian Mining and Metallurgical Bulletin, May, 1972, pp 46–49). As a result, a substantially pure acid copper eluant solution may be recovered from the ion exchanger, and these additional heavy metals will carry over into the zinc-bearing raffinate solution. Accordingly, the process of the invention contemplates treating the raffinate from the liquid ion exchange operation to precipitate said additional metals and to form a purified raffinate solution containing zinc and substantially completely free of copper and such additional heavy metals. Precipitation of heavy metals other than zinc preferably is accomplished by treatment of the raffinate with finely divided zinc metal. The purified raffinate then is treated to recover a high purity zinc product.

It is not essential that all the raffinate solution be subjected to treatment with carbon dioxide or to electrowinning, to recover the zinc contained therein. Especially when the zinc content of the material leached is substantially less than the copper content, it is sufficient to treat only from 25 to 75% of the raffinate solution to recover zinc, and the remainder of the raffinate, containing both zinc ammonium complex and ammonium carbonate or sulfate, may be recycled directly to the leaching operation.

The preferred liquid ion exchanger is a kerosene solution of a hydroxy oxime, but any liquid ion exchanger capable of selectively removing copper from zinc-bearing ammonium carbonate solutions may be used.

DETAILED DESCRIPTION OF THE INVENTION

Figure 1:
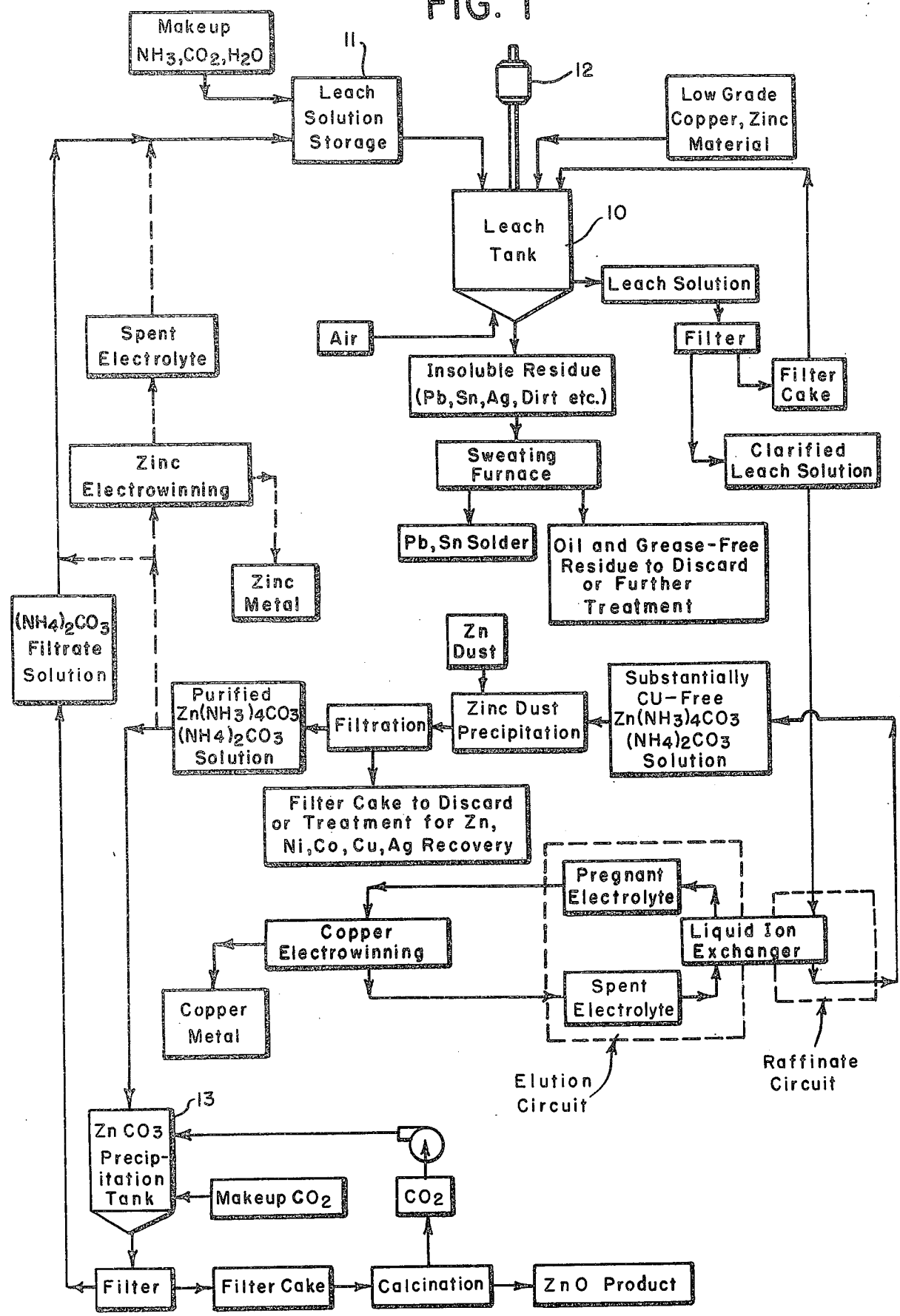
FIG. 1 of the accompanying drawings is a flowsheet of an advantageous embodiment of the invention using an ammoniacal ammonium carbonate leach solution.

In the processes of both flowsheets, low grade non-ferrous scrap metal such as junked automobile radiators and other copper, brass or bronze junk, or even relatively high grade scrap as turnings, punch press scrap, or scrap generated in brass mill fabricating operations, or other low grade material such as a smelter flue dust containing both copper and zinc, is charged into a closed leaching tank 10. The only requirement is that the material being leached be composed largely of copper and zinc, and preferably be low in nickel and cobalt, with relatively small proportions of insoluble elements, oils, dirt, etc. While it is feasible to treat materials in which the copper and zinc constitute only a small proportion of the total, it is not economically desirable to introduce major amounts of insoluble materials into a leaching tank from which they will later have to be removed.

Leach solution composed essentially of aqueous ammoniacal ammonium carbonate solution (FIG. 1) or aqueous ammoniacal ammonium sulfate solution (FIG. 2) is delivered from a storage tank 11 into the leaching tank in which the scrap or other material is being leached. For the most part the leach solution will be recycled ammonium carbonate or ammonium sulfate solution which may contain a substantial concentration of zinc ammonium carbonate. The latter is not present as a leaching reagent, but it may be more economical to allow part of it to recirculate with the ammoniacal solution than to remove it entirely from the recycled solution. Make-up water, ammonia and ammonium carbonate or ammonium sulfate to supply process losses may also be added to the leaching tank. Preferably such make-up is supplied by separately adding appropriate amounts of water, free ammonia, carbon dioxide (and, in the FIG. 2 embodiment, ammonium sulfate) to the leach solution storage tank 11 to which the recycled ammonical solution is delivered.

The concentration of the ammoniacal leach solution is not critical. Virtually any concentration is effective as a solvent for copper and zinc as metal or as oxidized compounds, but a relatively high concentration is desirable to promote rapid and efficient dissolution of these metals. Concentrations in the range from 100 g/l ammonium carbonate or sulfate up, say, to 500 or 600 g/l may be used; but in general a concentration of about 250 g/l of ammonium carbonate or ammonium sulfate is preferred. The leach solution may also contain, say, 5 to 20 g/l of zinc as zinc ammonium carbonate or sulfate present in the recycled solution.

The leach solution is passed through the leaching tank 10 in such manner as to pass over the entire charge therein. For example, solution may flow into the upper part of the tank and may be withdrawn from the bottom, or vise versa.

It is necessary, when the charge is a metallic scrap or contains copper or zinc values in metallic form, that an oxidant be introduced into the leaching tank to oxidize the copper and zinc metal to the corresponding ammonium complexes. Oxygen of the air is the oxidant preferably used; and air under pressure preferably is introduced into the leaching tank at the bottom and bubbles up through the charge therein. Such introduction of the oxidant thereby also agitates the solution in the tank and promotes rapid dissolution of the copper and zinc.

As is well known, the essential leaching reactions involve attack by cupric ammonium carbonate or sulfate on the metallic copper to form cuprous ammonium carbonate or sulfate and reoxidation of the latter to the cupric form by oxygen of the air in the presence of ammonium carbonate or sulfate. Zinc appears to dissolve directly as zinc ammonium carbonate or sulfate in the presence of oxygen. These reactions proceed rapidly, and a large amount of material, especially if it is scrap in the form of thin sheet metal or turnings having a large surface to volume ratio, or flue dust, can be dissolved in a relatively short period of time. Obviously, thick heavy scrap cannot be leached rapidly, and for maximum economy the scrap should not be in such form.

Leaching proceeds readily at or near room temperature. The leaching reactions are not endothermic and no heat need be supplied to the leaching operation.

The leaching tank is closed to prevent escape of ammonia, but it operates at atmospheric pressure. Preferably air is introduced at a rate only slightly greater than sufficient to meet the requirements of the leaching reaction, so that only nitrogen of the air, and very little or no excess oxygen, passes out of the leaching tank. The tank is provided with a vent 12 so that the nitrogen of the air can escape. The vent may be constructed so as to absorb in an acid medium any ammonia carried through it by the escaping nitrogen or excess air.

Leach solution withdrawn from the leaching tank contains a substantial concentration of dissolved copper and zinc, say from 35 to 100 g/l copper as cupric ammonium carbonate or sulfate and 10 to 50 g/l zinc as zinc ammonium carbonate or sulfate (part of the zinc being that introduced into the leaching tank with the recycled ammonium carbonate solution). The leach solution will also contain nickel and cobalt if either of these metals is present in the material leached. If present at all, however, they are usually present only in small proportions relative to the copper and zinc. They appear in solution as nickel ammonium carbonate or sulfate and cobalt ammonium carbonate or sulfate. If silver is present in the scrap, some may dissolve as a silver ammoniacal complex. Other components, such as iron, lead, tin, etc., of the scrap or other charge are for the most part insoluble in the ammoniacal leach solution.

The leach solution is preferably filtered upon its withdrawal from the leaching tank to separate small flakes and granules of insoluble or undissolved scrap components carried out of the tank in suspension in the solution. The filter residue is re-introduced into the leaching tank, and the clarified leach solution passes to treatment by liquid ion exchange.

Undissolved scrap and other leach residue is periodically flushed out from the leaching tank. The undissolved residue of a scrap metal charge consists of any lead, tin, iron, aluminum, undissolved silver, and like metals present in the original scrap, plus non-metallic elements and materials such as grease and dirt. If it contains a substantial amount of lead-tin solder, as is generally present in junked automobile radiators, the residue may be introduced into a sweating furnace and there heated to a temperature in the range from 250° to 400°C. Thereby the lead-tin solder is liquated and may be recovered as a fairly clean solder from which dirt and other unfused material can easily be skimmed. This product can readily be upgraded by composition adjustments, if necessary, to form a marketable solder, or it may be treated for separate recovery of its lead, tin, and other values. Grease will mostly be vaporized or burned off in the sweating furnace, and the remaining unfused residue may either be discarded or passed to further treatment for whatever values it contains.

Undissolved residue of a flue dust charge will consist mainly of iron, lead, silicious materials and perhaps arsenic compounds, and may be discarded or treated further to recover desired values.

The clarified leach solution is treated by a liquid ion exchanger to separate the zinc from the copper. The liquid ion exchanger is an organic water-immiscible solution of a reagent which will selectively load copper from an ammoniacal solution containing zinc. A particularly effective liquid ion exchanger is a kerosene or other liquid hydrocarbon solution of a hydroxy oxime such as the reagents sold by General Mills, Inc., under the tradenames LIX-63, LIX-64, LIX-65, and LIX-65N. Such reagents include 5,8-diethyl-7-hydroxy-6-dodecanone oxime, 2-hydroxy-5-sec-dodecylbenzophenone oxime, and various other alkyl and aryl substituted hydroxy oximes and certain of their chlorinated derivatives. (Di-2-ethyl hexyl) phosphoric acid is another usable liquid ion exchanger, but is less satisfactory. The amount of active ion exchanger dissolved in the kerosene or other inert organic solvent may vary within fairly wide limits, say from 5 to 40% by weight; but in general we have found a solution containing 30% by weight of hydroxy oxime in kerosene to be very satisfactory.

These liquid ion exchangers are well known in the art as extractants of copper from aqueous solutions, and their use in the process of the invention is in accord with conventional ion exchange techniques. The clarified aqueous ammoniacal leach solution is vigorously agitated with the kerosene solution of the ion exchanger, and as a result the copper is selectively extracted from the aqueous solution and loaded on the organic exchanger. The mutually immiscible aqueous and organic solutions are then allowed to separate, and the aqueous raffinate solution, which is the original leach solution containing zinc ammonium carbonate or sulfate, and other dissolved metals, plus ammonium carbonate or sulfate, but substantially completely free of copper, is separated from the organic phase and is passed to further treatment for purification and to separate zinc and recover ammonium carbonate or ammonium sulfate solution.

The copper-loaded organic liquid ion exchange solution is then vigorously agitated with an aqueous acid solution (preferably a sulfuric acid solution). The acid strips the copper from the ion exchanger compound, and when the aqueous acid phase is allowed to separate from the immiscible kerosene solution, the latter is in the form of regenerated liquid ion exchanger which is recycled to treat a further portion of ammoniacal leach solution. The separated acid solution, which now contains substantially all the copper originally dissolved in the leach solution, is treated to recover its copper content.

Any nickel and cobalt originally present in the scrap dissolves in the leach solution, but may be rejected from the ion exchanger by conducting the ion exchange reaction in two or more stages to fully load the ion exchanger with copper, which loads thereon in preference to these other metals. Hence the acid solution used to elute the liquid ion exchanger will contain essentially only copper as the dissolved metal, and will be substantially completely free of zinc and other heavy metals.

The acid solution used to elute the liquid ion exchanger may contain from 85 to 160 g/l of sulfuric acid. It is preferably spent electrolyte from the copper electrowinning operation described below, and it will then also contain from 10 to 40 g/l of recycled copper in solution when delivered into contact with the liquid ion exchanger. Typically it will contain 30 g/l copper and 110 g/l sulfuric acid. When withdrawn from contact with the liquid ion exchanger after elution of the latter, the copper content will have been increased by 2 to 10 g/l of copper, with a corresponding decrease in its acid content (about 1.5 g/l decrease in acid for each 1 g/l increase in copper).

Both loading and stripping of the liquid ion exchanger proceeds, as is customary in the art, in several stages. Typically there will be at least two loading stages and two or three stripping stages. That is, during loading of the liquid ion exchanger, the latter passes countercurrent to the leach solution through at least two loading operations, in the first of which partially loaded ion exchanger is mixed with fresh leach solution, and in the second of which the partially extracted leach solution is fully extracted with ion exchanger fresh from the elution operation. Similarly during elution the liquid ion exchanger passes countercurrent to the acid stripping solution through successive elution stages in each of which the progressively more completely eluted ion exchanger meets acid solution which is progressively more dilute in copper and stronger in acid. In this manner maximum efficiency in extracting copper from the leach solution and then eluting it in the acid solution is obtained.

Copper recovery is by conventional electrowinning, which involves electroplating copper from the acid copper sulfate eluant solution on to copper starting sheets, using insoluble anodes such as lead alloy anodes. High purity metallic-cathode copper is thus produced. As is usual in electrowinning operations, the acid copper sulfate solution is only partially depleted in copper during the electrolysis, with simultaneous regeneration of sulfuric acid at the cathode. Typically, the spent electrolyte withdrawn from the electrowinning cells contains from 10 to 40 g/l of copper and from 85 to 160 g/l sulfuric acid, as noted above. The spent electrolyte then recycles to the elution operation to replenish its copper content by elution of additional copper from the copper-loaded liquid ion exchanger.

Raffinate solution from the liquid ion exchange operation is substantially completely free of copper but may contain small concentrations of nickel, cobalt, and silver. In some cases it may contain a small amount of copper which was not picked up by the ion exchanger, and even some ferric iron. This solution, if it contains such heavy metals other than zinc, preferably is treated to remove them. The preferred treatment is to add metallic zinc, preferably in finely divided form such as zinc dust, to the raffinate solution, usually with some agitation of the solution during such treatment. The metallic zinc displaces by cementation all metals lower than zinc in the electromotive series, and thus effectively precipitates all nickel, cobalt, copper, iron, etc., that may be present. An excess of zinc metal is used to insure complete precipitation of these heavy metals.

Following the zinc dust purification treatment, the solution is filtered to remove the precipitated metals and the excess zinc dust. The filter cade may be discarded, or may be treated in any desired manner to recover its metal values.

Referring now particularly to FIG. 1, the purified raffinate solution recovered as filtrate from the filtration operation contains essentially only zinc as a heavy metal in a carbonate solution. Its zinc content may advantageously be recovered by treatment under pressure with carbon dioxide. To this end the raffinate solution, in whole or in part, is treated batchwise in a pressure-tight precipitation tank 13 with carbon dioxide at a pressure in the range from 5 to 25 psi for ¼ to 1 hour, preferably while being agitated, at or near room temperature. This treatment effects almost quantitative precipitation of zinc from the solution as a zinc carbonate product, leaving an aqueous solution containing essentially only ammonium carbonate as the dissolved component.

At the conclusion of the precipitation treatment, the precipitation tank 13 is emptied through a filter, and the clarified ammonium carbonate solution is recycled to the leach solution storage vessel 11. The filter cake of zinc carbonate is collected and calcined at a temperature above 300°C., preferably in the range from 325° to 750°C., to produce zinc oxide. The carbon dioxide evolved during calcination may be collected for re-use in a further zinc carbonate precipitation operation.

Zinc oxide produced by calcination may be used as smelter feed to a zinc smelter, or it may be leached with sulfuric acid to produce electrolyte for zinc electrowinning. In either such case, clacination will ordinarily be at a low temperature in the above range (e.g., 325°–400°C.). If high purity zinc oxide is to be produced for the market, calcination is preferably at a temperature in the upper part of the range (700°–750°C.).

It is not necessary that all the raffinate solution be subjected to the zinc carbonate precipitation treatment. Depending on the zinc content of the raffinate, from 25 to 75% may be so treated and the balance may be returned directly to the leach solution storage tank 11.

As an alternative to carbon dioxide precipitation of the zinc as a carbonate, a portion or all of the copper-free raffinate solution from the zinc dust purification treatment may be subjected directly to electrolysis to electrowin zinc therefrom. High purity zinc metal may thus be recovered, and the spent electrolyte, containing some zinc ammonium carbonate, may be recycled directly to the leaching operation.

Figure 2:
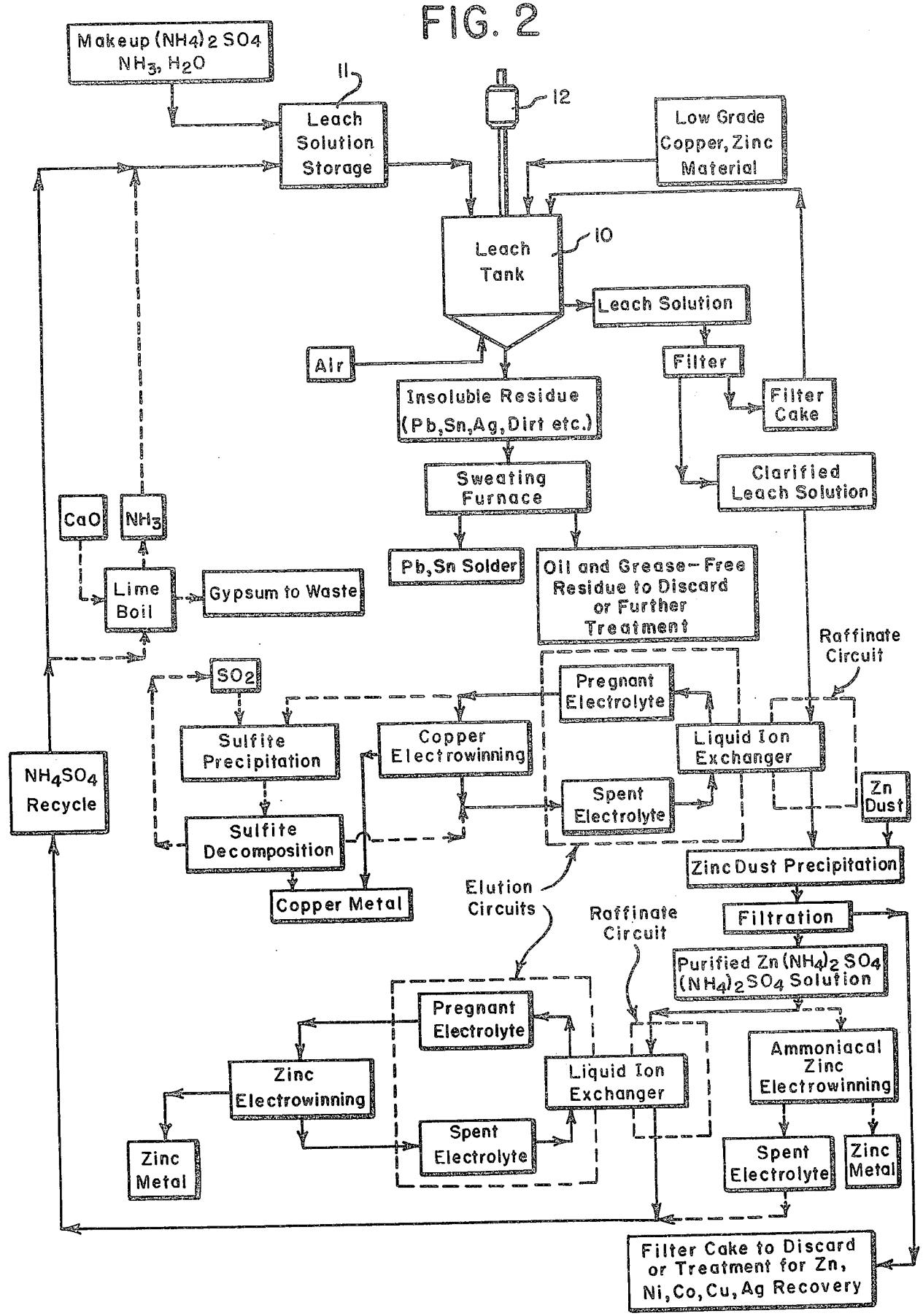
FIG. 2 is a flowsheet of an advantageous embodiment of the invention with indicated alternative steps, using an ammoniacal ammonium sulfate leach solution.

Referring now particularly to FIG. 2, further alternative procedures for copper and zinc recovery are shown. One such alternative is to recover the copper from the liquid ion exchanger eluant solution by chemical precipitation rather than by electrowinning. To this end the acid pregnant electrolyte containing copper stripped from the liquid ion exchanger, instead of being electrolyzed, is treated by passing sulfur dioxide into it to precipitate the copper as a copper sulfite. The precipitate may be decomposed, without separating it from the residual solution, by heating under pressure (typically 150 to 220 psi) to a temperature in the range from 140° to 170°C. Copper metal in powdered or granular form is the solid product of this decomposition, and may be recovered by decantation and washing from the residual solution. Sulfur dioxide released in the decomposition operation may be recycled to treat additional pregnant electrolyte. The residual solution from the decomposition operation is essentially a sulfuric acid solution that as spent electrolyte is used to strip copper from the liquid ion exchanger.

Zinc is recovered, in accordance with the flowsheet of FIG. 2, by treating the purified raffinate from the copper extraction operation in a further liquid ion exchanger operation, using as the liquid ion exchanger a kerosene solution of a compound similar to that employed in the copper extraction circuit, but capable of loading zinc. Zinc is then stripped from the loaded liquid ion exchanger by a sulfuric acid solution, and is recovered from such solution by electrowinning. The loading and stripping of the liquid ion exchanger in this zinc recovery circuit, and the zinc electrowinning operation, are carried out similarly to the corresponding operations in the copper recovery circuit. The raffinate from which the liquid ion exchanger has extracted the zinc is essentially an ammoniacal ammonium sulfate solution substantially free of heavy metals (except possibly some unextracted zinc) and is recycled for re-use in the leaching operation.

Instead of extracting zinc by means of a liquid ion exchanger from the purified raffinate of the copper extraction operation, such raffinate may be subjected directly to electrolysis to electrowin zinc from it. The composition of the purified raffinate, in terms of its zinc, sulfate, and ammonium ion concentrations, is generally about right for direct electrowinning, but in any event the leaching operation can be conducted to produce a satisfactory zinc electrowinning electrolyte. Since the electrolyte will be depleted in zinc during the electrowinning operation by only about one third or less (say from 52 g/l to 39 g/l), and the remainder of the zinc in solution will be recycled to the leaching operation, direct electrowinning is best suited for use when the proportions of zinc to copper in the material being leached is relatively low.

The zinc-depleted ammoniacal ammonium sulfate solution (i.e., raffinate from the zinc-extracting liquid ion exchanger or spent electrolyte from the zinc electrowinning operation) is recycled for use in the leaching operation. As noted on FIG. 2, a bleed stream may be taken from this recycle and subjected to boiling with lime to liberate and recover its ammonia content and to reject as gypsum excess sulfate ion, and at the same time to eliminate other impurity accumulations. However, the recycle liquor is usually quite thoroughly purified in the course of treatment to recover copper and zinc, and very little if any excess sulfate is usually incorporated in the solution during leaching, so in many cases the lime boil treatment may be eliminated, or the bleed stream to which it is applied may be very small.

EXAMPLE

The leach tank 10 is charged with 150 tons of automotive radiator junk and other copper alloy scrap assaying in the aggregate 70% copper, 11% zinc, 9% lead, 3% tin and 6 oz/ton silver. A solution containing 250 g/l ammonium carbonate, mainly consisting of recycle liquor, is passed through the leaching tank at the rate of 250 gallons per minute (gpm.). Air is introduced into the leaching tank at a rate sufficient to produce a slight discharge of excess oxygen plus the nitrogen of the air through the vent 12. pregnant leach solution withdrawn from the leaching tank at the rate of 250 gpm. contains 70 g/l copper as copper ammonium carbonate and 22 g/l zinc as zinc ammonium carbonate. All the iron, lead, tin and silver remains undissolved. This undissolved residue is allowed to accumulate in the leaching tank until sufficient is present to warrant discharging it to a sweating furnace, where the lead-tin solder is liquated at a temperature of about 350°C. The unfused scum of metals and dirt is skimmed from the molten solder, and the latter is cast into bars for marketing.

The pregnant leach solution is subjected to liquid ion exchange using as the liquid ion exchanger a 30% solution in kerosene of 2-hydroxy-5-sec-dodecylbenzophenone oxime. The resulting raffinate solution, quite completely free of copper, contains substantially all the zinc (22 g/l) and ammonium carbonate of the leach solution. This solution is treated with electrolytic zinc in finely divided (dust) form to precipitate any heavy metal impurities which it contains. The residual zinc metal and precipitated impurities are filtered from the solution, and one-half of the resulting purified raffinate is treated at 10 psi with carbon dioxide, precipitating substantially its entire zinc content as a zinc carbonate product. This precipitate is calcined at about 700°C. to produce high purity zinc oxide for the market. The residual zinc-depleted ammonium carbonate solution is united with the untreated half of the purified raffinate solution and is recycled to the leaching tank.

The liquid ion exchanger is eluted with spent electrowinning electrolyte containing 30 g/l sulfuric acid and 110 g/l copper sulfate to produce electrowinning cell feed solution containing about 37 g/l copper and 100 g/l $H_2SO_4$. This solution is electrolyzed in electrowinning cells utilizing insoluble lead alloy anodes to produce high purity copper cathodes for the market. The spend electrolyte from the electrowinning cells, depleted in copper and replenished in acid to the original value stated above, is recycled to elute a further portion of the liquid ion exchanger.

We claim:

1. In a method for separating and separately recovering copper and zinc from low grade metallic scrap containing relatively large proportions of copper and zinc in association with relatively small proportions of other elements which comprises leaching the scrap with ammonium carbonate solution in the presence of oxygen to form a leach solution containing copper ammonium carbonate and zinc ammonium carbonate, and separating the resulting leach solution from the undissolved residue, the improvement which comprises
    a. selectively removing the copper from the leach solution by treatment with a liquid ion exchanger, thereby producing as a raffinate an aqueous ammonium carbonate solution containing zinc in solution as zinc ammonium carbonate and substantially completely free of copper,
    b. subsequently treating the liquid ion exchanger with an aqueous acid solution to form an aqueous acid eluant solution containing copper and substantially completely free of zinc,
    c. treating the eluant solution to electrowin substantially pure copper therefrom,
    d. introducing carbon dioxide into the raffinate solution while maintaining such solution under a substantial super-atmospheric pressure, thereby precipitating a substantially pure zinc carbonate product,
    e. separating the zinc carbonate precipitate from the residual ammonium carbonate solution and recovering zinc therefrom in the form of a substantially pure product, and f. recycling said residual ammonium carbonate solution for re-use in leaching a further quantity of scrap.

2. In the method according to claim 1 wherein the metallic scrap being leached contains at least one additional metal of the group consisting of nickel, cobalt and silver which dissolves in the leach solution, the improvement which comprises selectively removing the copper from the leach solution by treatment with the liquid ion exchanger, treating the raffinate from the liquid ion exchange operation to precipitate said additional metal and to form a purified aqueous raffinate solution containing zinc and substantially completely free of copper and said further metal, and treating said purified raffinate solution to precipitate a high purity zinc carbonate product therefrom.

3. The method according to claim 2, wherein the additional metal is precipitated by treatment of the raffinate from the liquid ion exchange operation with metallic zinc.

4. The method according to claim 3 wherein the raffinate is agitated with metallic zinc in a finely divided form.

5. A method according to claim 1 wherein the undissolved residue of the leaching operation contains a substantial proportion of lead and tin and said residue is heated to a temperature in the range from 250°C. to 400°C. to liquate a lead-tin solder which is separated from the unfused remainder of the residue.

6. The method according to claim 1 wherein the zinc carbonate precipitate is calcined to form carbon dioxide and substantially pure zinc oxide.

7. The method according to claim 1 wherein the raffinate solution is maintained under a pressure in the range from 5 to 25 psi during treatment thereof with carbon dioxide to precipitate the zinc carbonate product.

8. The method according to claim 1 wherein from 25 to 75% of the raffinate solution is treated with carbon dioxide to precipitate zinc carbonate and the remainder of said solution is recycled directly for re-use in leaching a further portion of scrap.

9. In a method for separating and separately recovering copper and zinc from low-grade metallic and oxidized materials containing relatively large proportions of copper and zinc in association with relatively small proportions of other elements which comprises leaching such materials with an aqueous ammoniacal solution selected from the group consisting of aqueous ammonium carbonate solutions and aqueous ammonium sulfate solution to form a leach solution containing copper ammonium complex and zinc ammonium complex, and separating the resulting leach solution from the undissolved residue, the improvement which comprises a. selectively removing the copper from the leach solution by treatment with a liquid ion exchanger, thereby producing as a raffinate an aqueous ammoniacal solution containing zinc in solution as a zinc ammonium complex and substantially completely free of copper, b. subsequently treating the liquid ion exchanger with an aqueous acid solution to form an aqueous acid eluant solution containing copper and substantially completely free of zinc, c. treating the eluant solution to recover substantially pure copper therefrom, d. introducing carbon dioxide into the raffinate solution while maintaining such solution under a substantial super-atmospheric pressure, thereby precipitating a substantially pure zinc carbonate product, e. separating the zinc carbonate precipitate from the residual ammonium carbonate solution and recovering zinc therefrom in the form of a substantially pure product, and f. recycling said residual ammoniacal solution for re-use in leaching a further quantity of the low grade material.

10. In a method according to claim 9 wherein the low grade material being leached contains at least one further metal which dissolves in the leach solution, the improvement which comprises selectively removing the copper from the leach solution by treatment with the liquid ion exchanger, treating the raffinate from the liquid ion exchange operation to precipitate said additional metal and to form a purified aqueous raffinate solution containing zinc and substantially completely free of copper and said further metal, and treating said purified raffinate solution to recover therefrom a zinc product of high purity.

11. The method according to claim 10 wherein the further metal is electronegative with respect to zinc and is precipitated by treatment of the raffinate from the liquid ion exchange operation with metallic zinc.

12. The method according to claim 11 wherein the raffinate is agitated with metallic zinc in finely divided form.

13. The method according to claim 9 wherein the liquid ion exchanger is a kerosene solution of a hydroxy oxime.

14. The method according to claim 9 wherein the leach solution upon withdrawal from the leaching operation is filtered, the filtrate is passed to treatment with the liquid ion exchanger, and the filter residue is returned to the leaching operation.

15. The method according to claim 9 wherein the copper is recovered by electrowinning from the eluant solution.

16. The method according to claim 9 wherein the eluant solution is treated with sulfur dioxide to precipitate copper sulfite and the sulfite precipitate is subsequently decomposed to copper metal.

* * * * *